United States Patent
Chen et al.

(10) Patent No.: US 7,347,569 B2
(45) Date of Patent: Mar. 25, 2008

(54) CORRECTING APPARATUS FOR PROJECTION SYSTEM

(75) Inventors: Shou-Chih Chen, Miao-Li (TW);
Hung-Chieh Huang, Miao-Li (TW);
Chuan-Te Cheng, Miao-Li (TW);
Sze-Ke Wang, Miao-Li (TW);
Sea-Huang Lee, Miao-Li (TW)

(73) Assignee: Coretronic Corp., Miao-Li County (TW)

( * ) Notice: Subject to any disclaimer, the term of this patent is extended or adjusted under 35 U.S.C. 154(b) by 292 days.

(21) Appl. No.: 11/205,997

(22) Filed: Aug. 18, 2005

(65) Prior Publication Data

US 2006/0050250 A1 Mar. 9, 2006

(30) Foreign Application Priority Data

Sep. 7, 2004 (TW) .............................. 93126984 A (51) Int. Cl.
*G03B 21/14* (2006.01)
*G02B 9/00* (2006.01)

(52) U.S. Cl. .......................... 353/97; 353/100; 359/738

(58) Field of Classification Search ................. 353/97, 353/88–93, 100–102, 122, 69, 28; 359/611, 359/613, 683, 697–704, 722–724, 738–740
See application file for complete search history.

(56) References Cited

U.S. PATENT DOCUMENTS

| | | | |
|---|---|---|---|
| 5,537,166 A * | 7/1996 | Keelan et al. | 353/97 |
| 7,234,821 B2 * | 6/2007 | Wang | 353/97 |
| 2004/0080723 A1 * | 4/2004 | Inamoto | 353/97 |
| 2005/0018150 A1 * | 1/2005 | Kamijima et al. | 353/100 |
| 2006/0092496 A1 * | 5/2006 | Chen et al. | 359/292 |

* cited by examiner

*Primary Examiner*—Andrew T Sever
(74) *Attorney, Agent, or Firm*—Bacon & Thomas, PLLC (57) ABSTRACT

The present invention provides a correcting apparatus for correcting images projected from a projection system. The correcting apparatus includes a correcting module and a projection lens. The correcting module shields a light signal for producing a corrected light signal. The projection lens receives the corrected light signal for producing an image light signal. The correcting module is disposed on a first outer circumference at one end of the projection lens.

7 Claims, 10 Drawing Sheets

CORRECTING APPARATUS FOR PROJECTION SYSTEM

FIELD OF THE INVENTION

The present invention relates to a correcting apparatus, and more particularly, to a correcting apparatus for correcting images projected from a projection system.

BACKGROUND OF THE INVENTION

Figure 1:
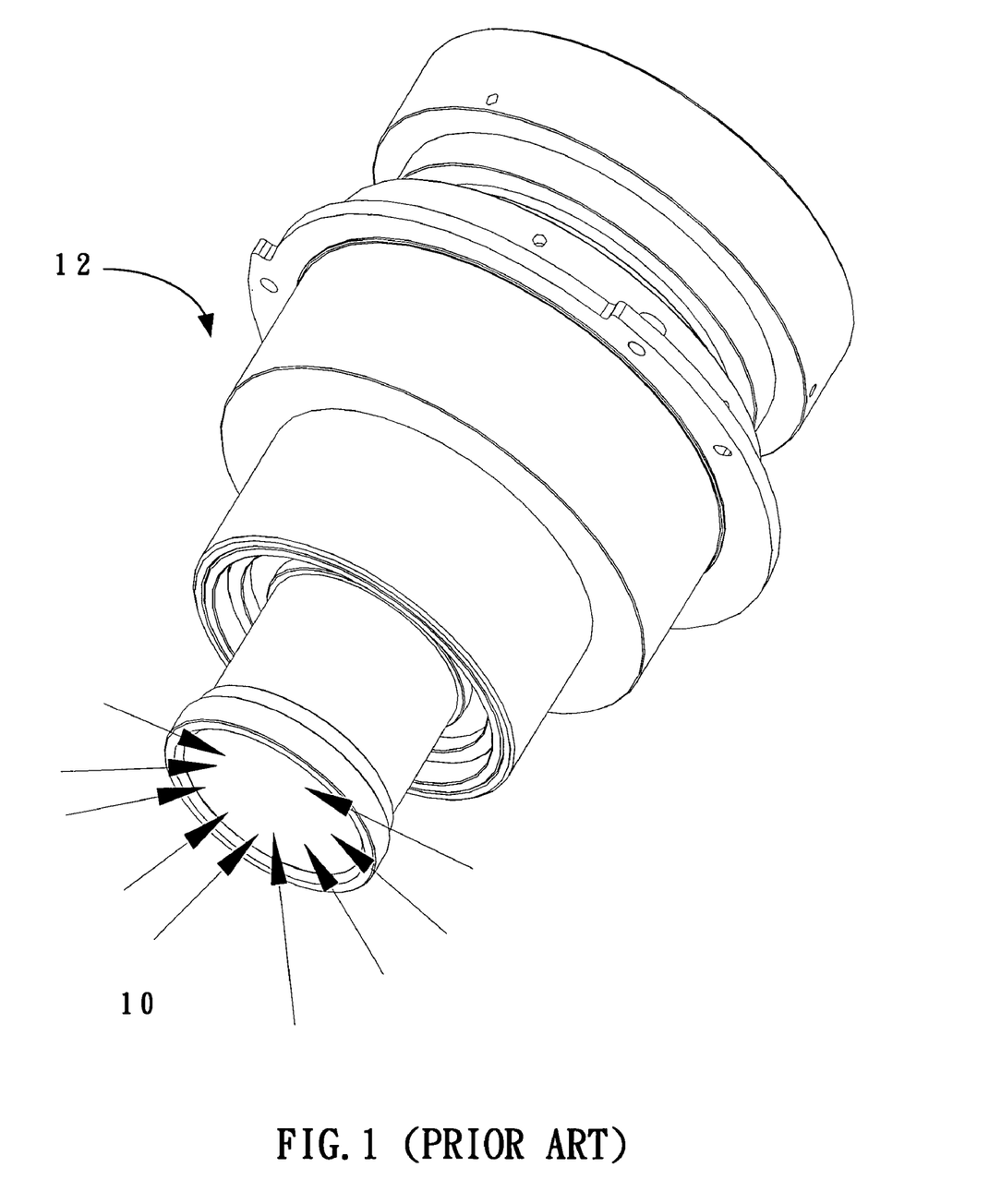
FIG. 1 is a schematic view showing stray lights in a projection system in the prior art.

Please refer to FIG. 1. As shown in FIG. 1, although a light-blocking sheet is disposed in a projection system for blocking the stray light 10, the stray light 10 coming from all directions is still possible to enter the projection lens 12, and consequently the contrast of the images projected from a projection system is lowered.

Figure 2:
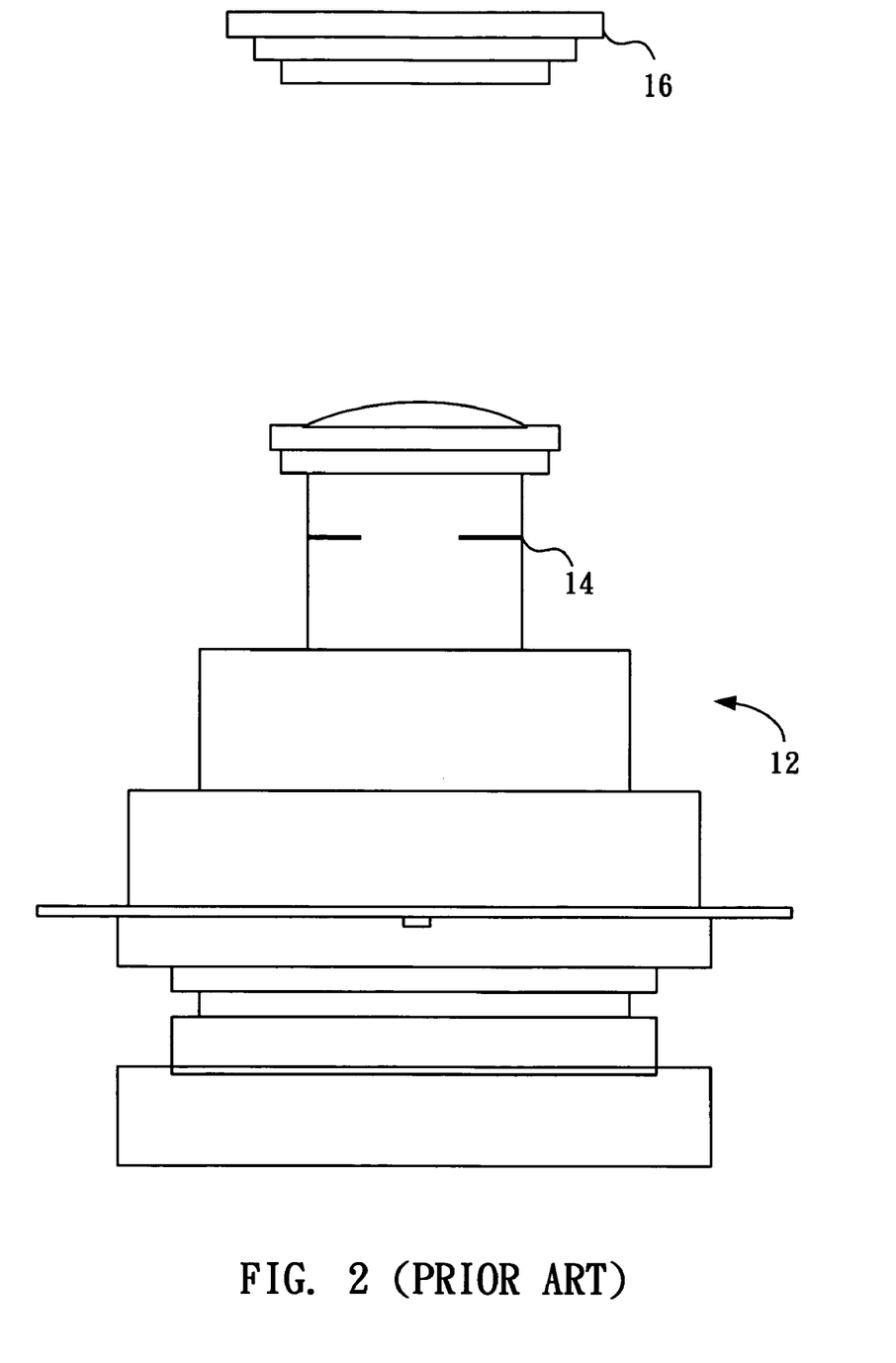
FIG. 2 is a schematic view showing a light-blocking sheet disposed in a projection lens in the prior art.

Please refer to FIG. 2. A light-blocking sheet 14 is disposed in the projection lens 12 for preventing stray lights in the projection system from being projected through the projection lens onto a screen (not shown in the figure), and for preventing the contrast and the definition of the projected images from lowering. Because the light-blocking sheet 14 is fixed to the inside of the projection lens 12, when light is projected from a light valve 16 into the projection lens 12, the light-blocking sheet 14 disposed inside the projection lens 12 can block ineffective lights for making images projected from the projection system more clear and increasing the contrast of images.

Conventionally, the light-blocking sheet 14 is disposed inside the projection lens 12 and cannot be adjusted after the projection lens 12 is assembled. Thus, the appropriate position of the light-blocking sheet 14 is determined after a complex calculation. This is time-consuming and the cost is higher. In addition, the position of the light-blocking sheet 14 is not suitable for every different kind of optical system. When in production, the variation caused by each component in the projection system cannot be corrected effectively. The common variations that affect images projected from the projection system include variation in the light valve 16, variation in the assembly of the projection, variation in the disposition of the light source and variation in the production of the projection lens. Although the light-blocking sheet 14 is disposed inside the projection lens 12, the light-blocking sheet 14 is fixed to the inside of the projection lens 12 and cannot be adjusted according to the variations in other components of the projection system. Consequently, the quality of images projected from the projection system is not optimized. The contrast and the definition of images cannot be increased, either.

SUMMARY OF THE INVENTION

One object of the present invention is to provide a correcting apparatus for a projection system, for correcting images projected from the projection system The present invention provides a correcting apparatus for correcting images projected from a projection system. The correcting apparatus includes a correcting module and a projection lens. The correcting module shields a light signal for producing a corrected light signal. The projection lens receives the corrected light signal for producing an image light signal. The correcting module is disposed on a first outer circumference at one end of the projection lens.

In the correcting apparatus of the present invention, the correcting module is disposed on the first outer circumference at one end of the projection lens for shielding the light signal and producing the corrected light signal to be transmitted to the projection lens and be projected as images. Accordingly, the position of the correcting module can be adjusted according to different variations from the whole projection system, and thereby the contrast and the definition of the images projected from the projection system can be increased effectively.

BRIEF DESCRIPTION OF THE DRAWINGS

The above and other objects, advantages, and features of the present invention will be understood from the following detailed description of the invention when considered in connection with the accompanying drawings below.

DETAILED DESCRIPTION OF THE PREFERRED EMBODIMENT

Figure 3:
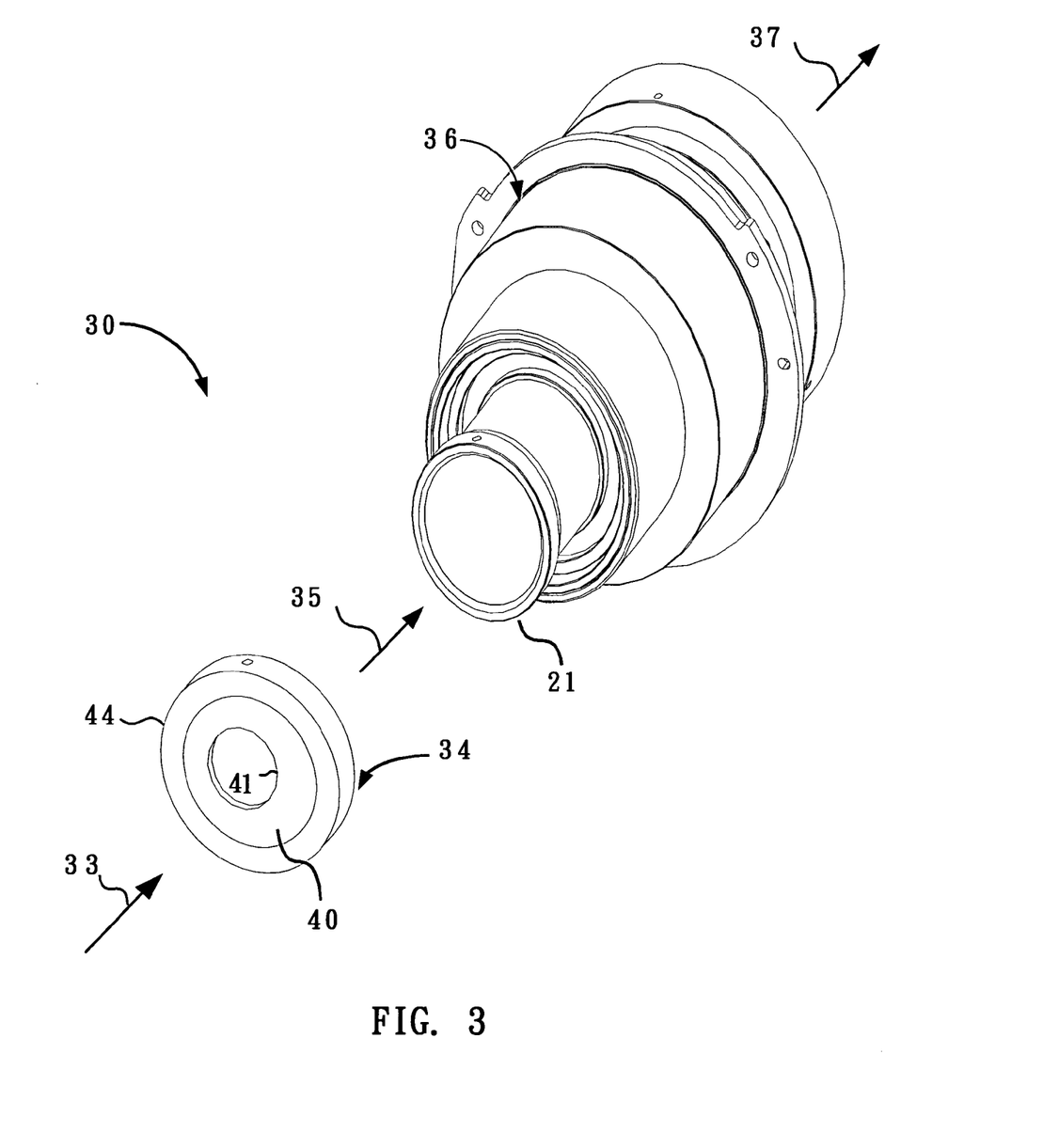
FIG. 3 is an exploded schematic view showing the correcting apparatus according to one embodiment of the present invention.

Please refer to FIG. 3. FIG. 3 is a schematic view showing the correcting apparatus 30 according to one embodiment of the present invention. A projection system according to the present invention includes an optical system (not shown in the figure) and a correcting apparatus 30. The optical system provides a light signal 33 to a correcting apparatus 30. After the correcting apparatus 30 corrects the light signal 33, images are projected onto a screen (not shown in the figure).

The correcting apparatus 30 includes a correcting module 34 and a projection lens 36. The correcting module 34 is disposed on a first outer circumference 21 at one end of the projection lens 36 for shielding a light signal 33 so as to produce a pair of corrected light signals 35. The projection lens 36 receives the pair of corrected light signals 35 to produce a pair of image light signals 37 and projects the image light signals 37 onto a screen.

Figure 4:
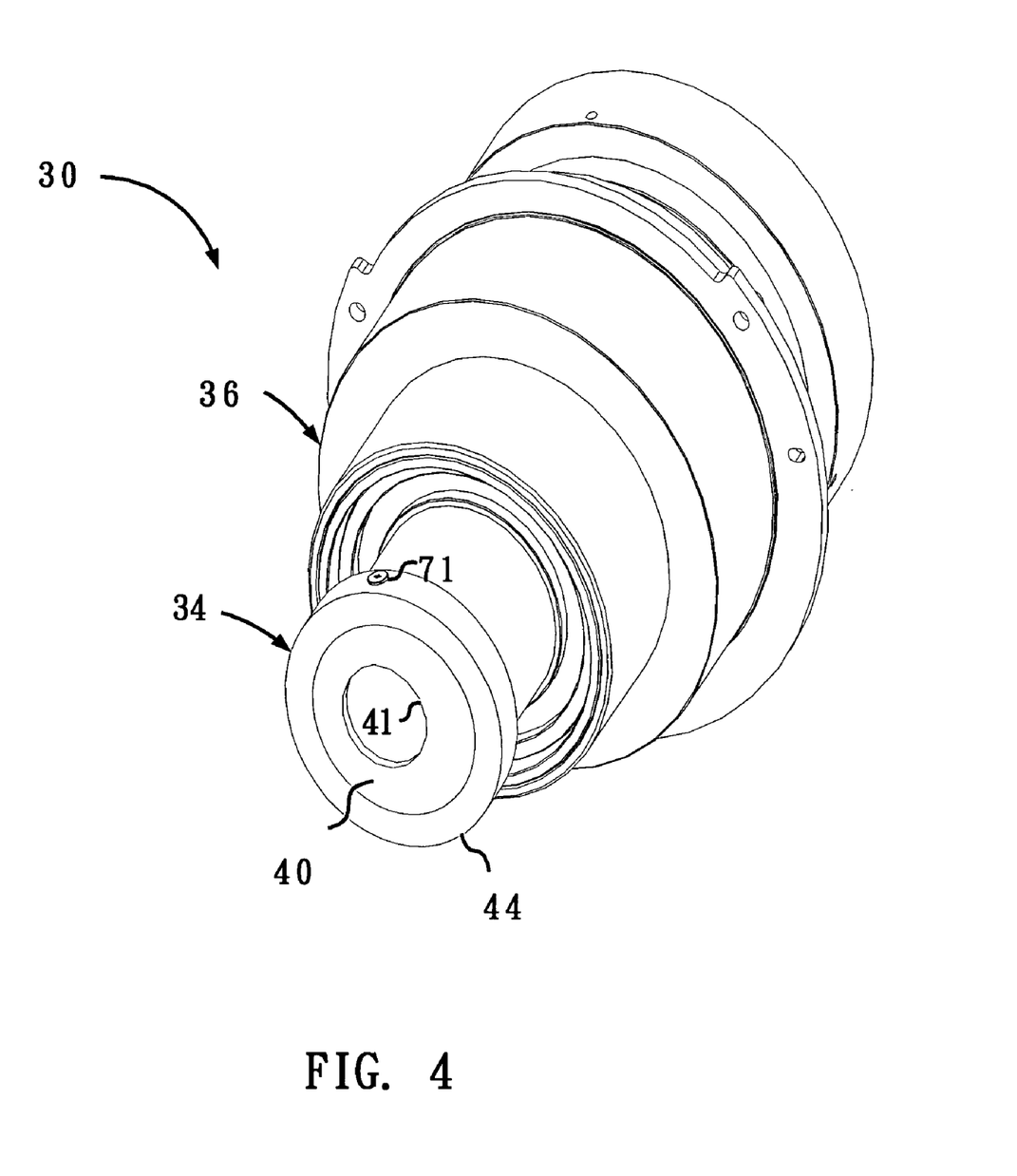
FIG. 4 is a schematic view showing the assembly of the correcting apparatus according to one embodiment of the present invention.

Please refer to FIG. 3 and FIG. 4. FIG. 4 is a schematic view showing the assembly of the correcting apparatus 30 according to one embodiment of the present invention. The correcting module 34 includes a ring shield 40 and a fixer 71. The ring shield 40 includes a second inner circumference 41 and a second outer circumference 44. The center of the second inner circumference 41 and the center of the second outer circumference 44 are concentric. The fixer 71 fixes the ring shield 40 to a first outer circumference 21 at one end of the projection lens 36.

Figure 5:
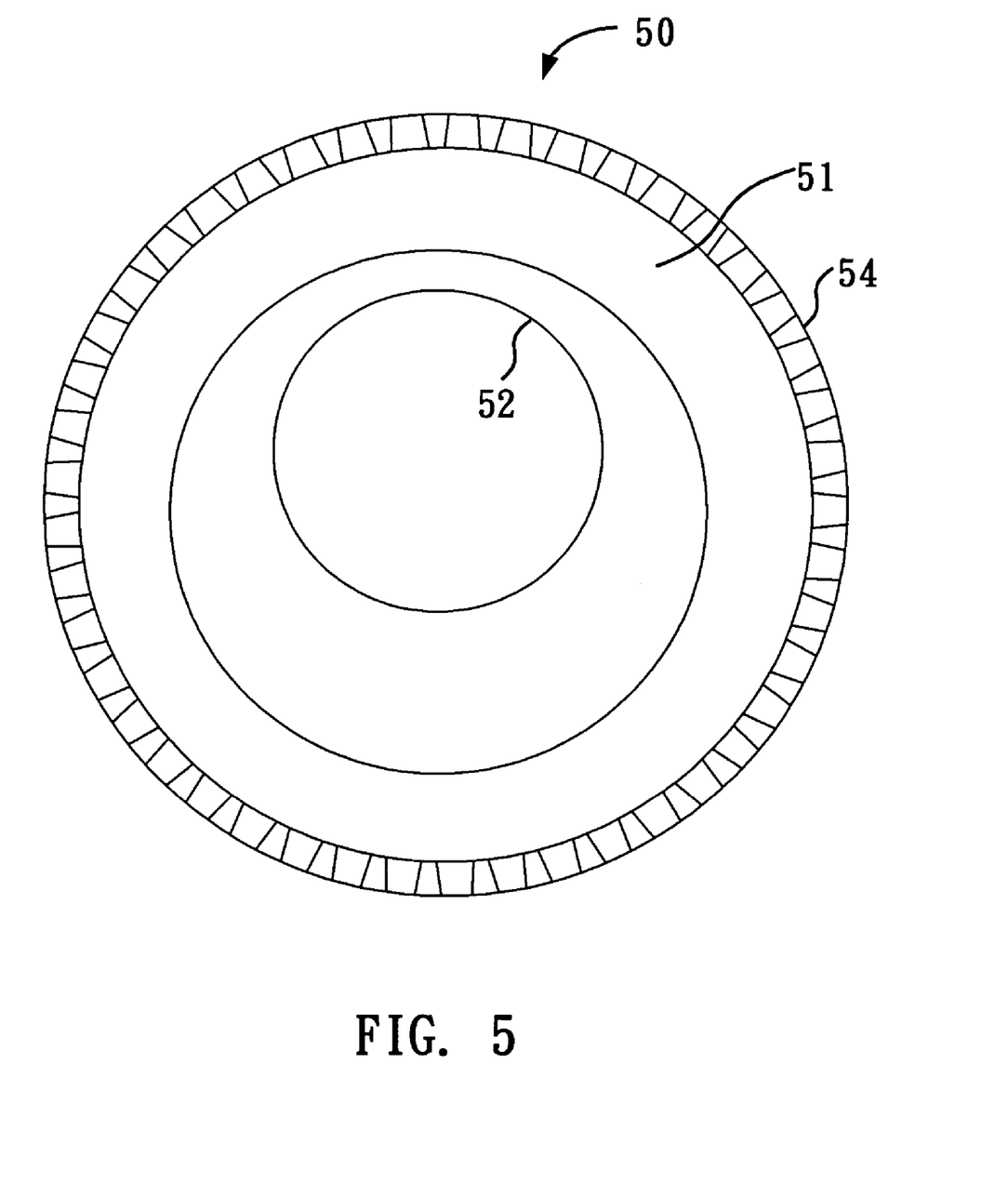
FIG. 5 is a schematic view showing the correcting module of the correcting apparatus according to another embodiment of the present invention.

Please refer to FIG. 5. FIG. 5 is a schematic view showing the correcting module 50 of the correcting apparatus 30 according to another embodiment of the present invention. In the ring shield 51 of this embodiment, there is a predetermined distance between the center of the second inner circumference 52 and the center of the second outer circumference 54. The difference between this embodiment and the above-mentioned embodiment is that, the center of the second inner circumference 52 is deviated from the center of the second outer circumference 54.

Figure 6A:
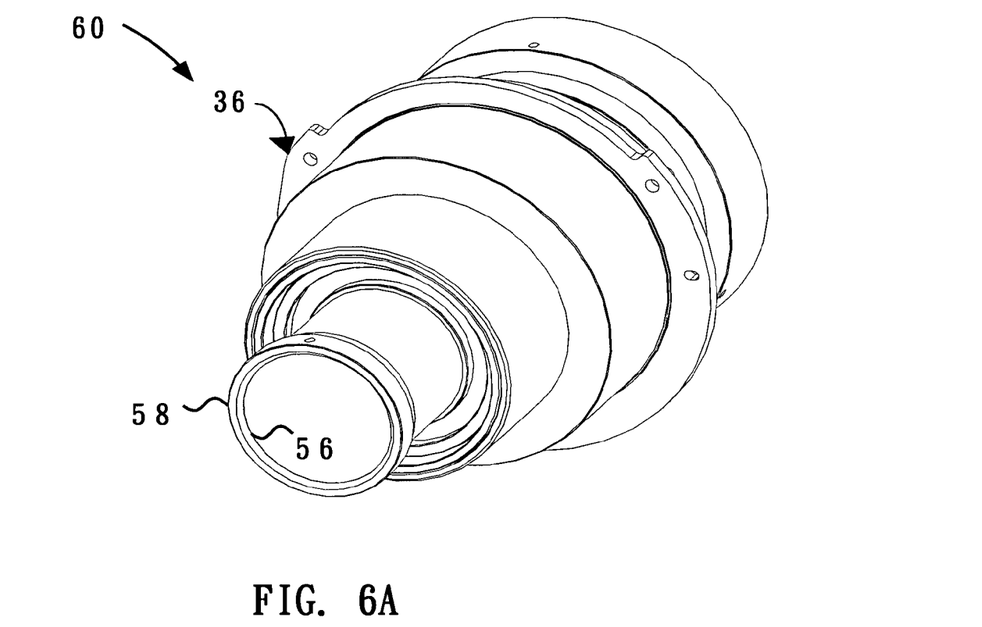
FIG. 6A is a schematic view showing the projection lens of the correcting apparatus according to one embodiment of the present invention.
Figure 6B:
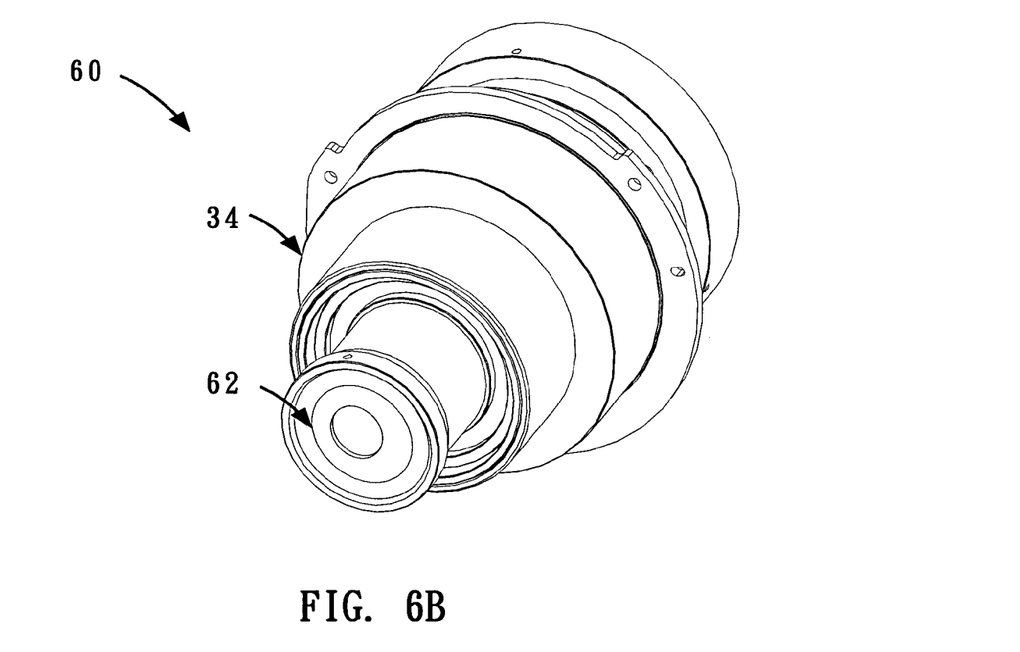
FIG. 6B is a schematic view showing the correcting module of the correcting apparatus according to still another embodiment of the present invention.

Please refer to FIG. 6A and FIG. 6B. FIG. 6A is a schematic view showing the projection lens 36 of the correcting apparatus 30 according to one embodiment of the present invention. FIG. 6B is a schematic view showing the correcting module 62 of the correcting apparatus 60 according to still another embodiment of the present invention. As shown in FIG. 6A, a first outer circumference at one end of the projection lens 36 includes a first inner circumference 56 and a first outer circumference 58. As shown in FIG. 6B, the fixer (not shown in FIG. 6B) of the correcting module 62 is connected with the first inner circumference 56 at one end of the projection lens 36 so as to attach the correcting module 62 to the first inner circumference 56 at one end of the projection lens 36. The difference between this embodiment and the above-mentioned embodiments shown in FIG. 4 and FIG. 5 is that, the correcting module of this embodiment is connected with the inner circumference of the projection lens while the correcting module of the above-mentioned embodiments is connected with the outer circumference of the projection lens. Both the above two connecting methods can block stray lights from entering the projection lens, and thereby increase the contrast and the definition of the images.

Figure 7A:
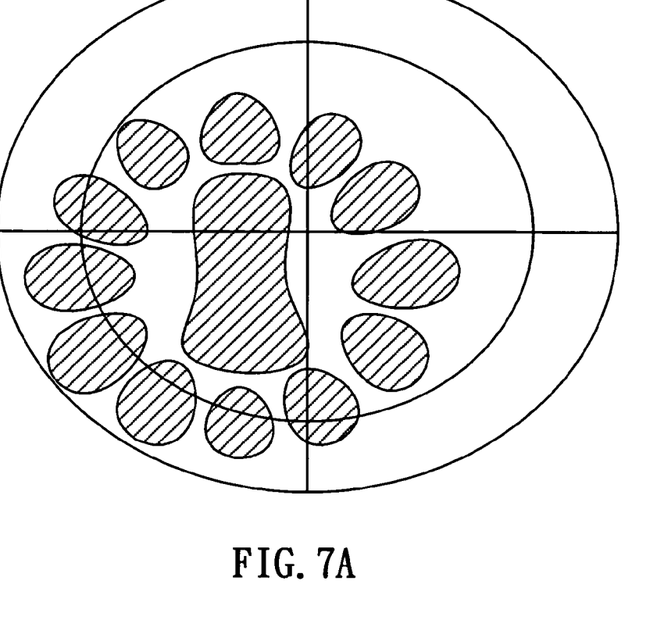
FIG. 7A and FIG. 7B are schematic views showing the positions of the correcting module and the corrected light signal.
Figure 7B:
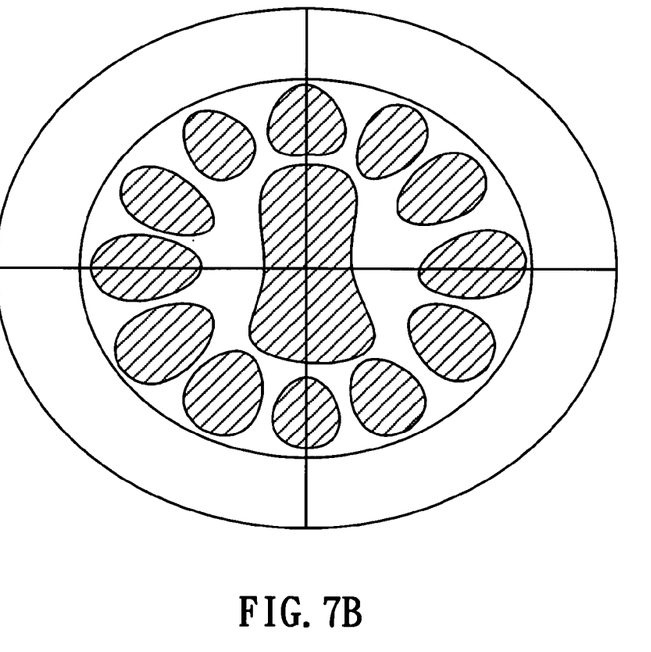

Please refer to FIG. 7A and FIG. 7B. FIG. 7A and FIG. 7B are schematic views showing the positions of the correcting module 34 and the corrected light signal. As shown in FIG. 7A, the position of the correcting module 34 is incorrect and the correcting module 34 shields an incorrect portion of the light signal, resulting in the asymmetry of the projected image. As shown in FIG. 7B, the correcting module 34 of the present invention can be rotated to a proper position so as to make the images projected correctly.

Figure 8:
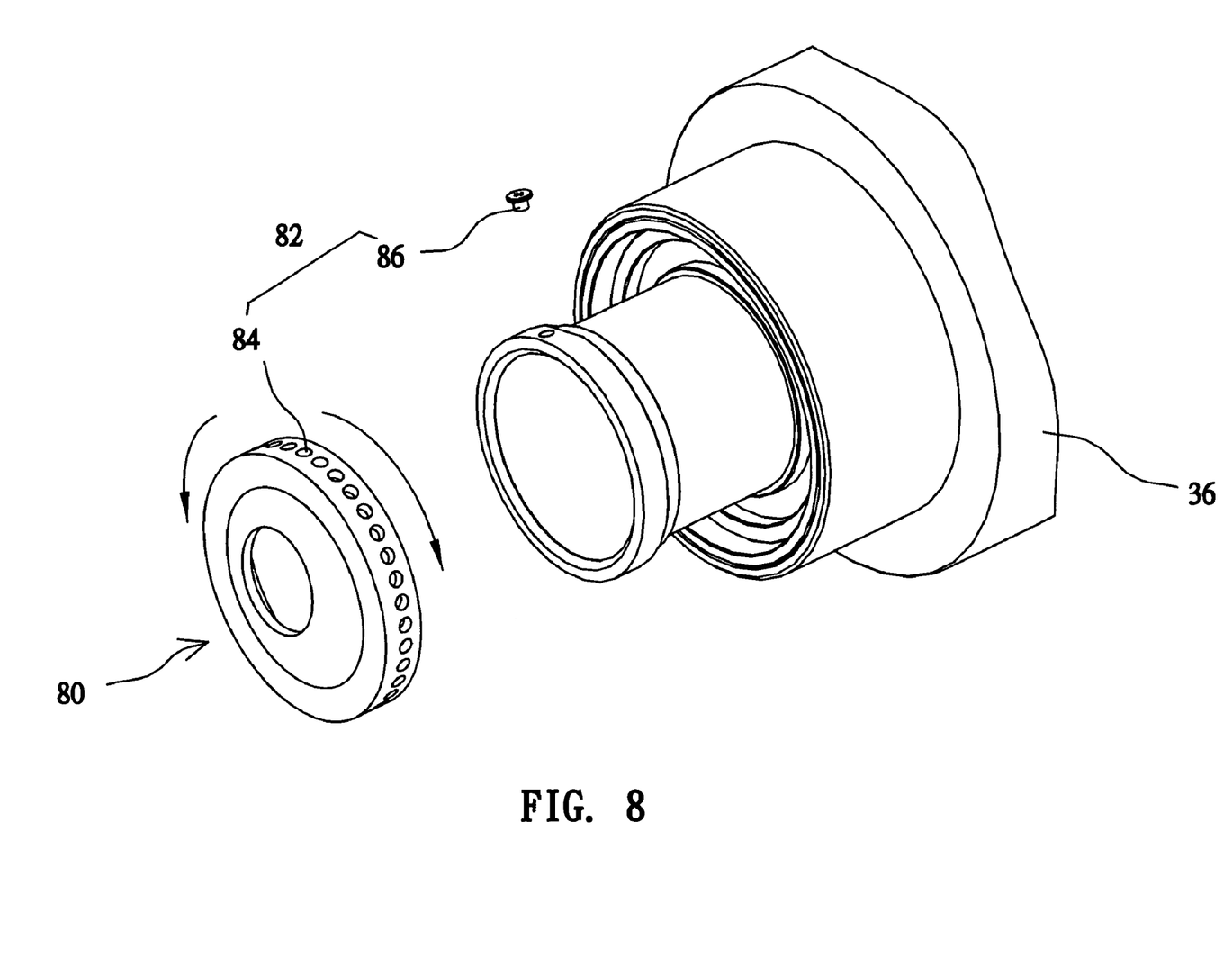
FIG. 8 is a schematic view showing the correcting module of the correcting apparatus according to still another embodiment of the present invention.

Please refer to FIG. 8. FIG. 8 is a schematic view showing the correcting module 80 of the correcting apparatus according to still another embodiment of the present invention. In this embodiment, the fixer 82 includes a plurality of positioning holes 84 and a fixing component 86 (not shown in the figure) disposed on a first outer circumference at one end of the projection lens 36. The fixing component 86 is fixed to one of the positioning holes 84 for fixing the correcting module 80 to a first outer circumference at one end of the projection lens 36. The fixing component 86 can be a screw and the positioning hole 84 can be a threaded hole. When the correcting module 80 is adjusted to a proper position, the fixing component 86 can pass through the projection lens 36 and then be fixed to the positioning hole 84 so as to fix the correcting module 80.

Therefore, the correcting apparatus of the present invention can use the center of the first outer circumference as the center for rotating, and fix the correcting module to a predetermined position of the first outer circumference at one end of the projection lens by rotating, wherein the predetermined position is a position where stray lights are shielded and images are projected correctly, so that the projection lens can project image light signals correctly.

Figure 9A:
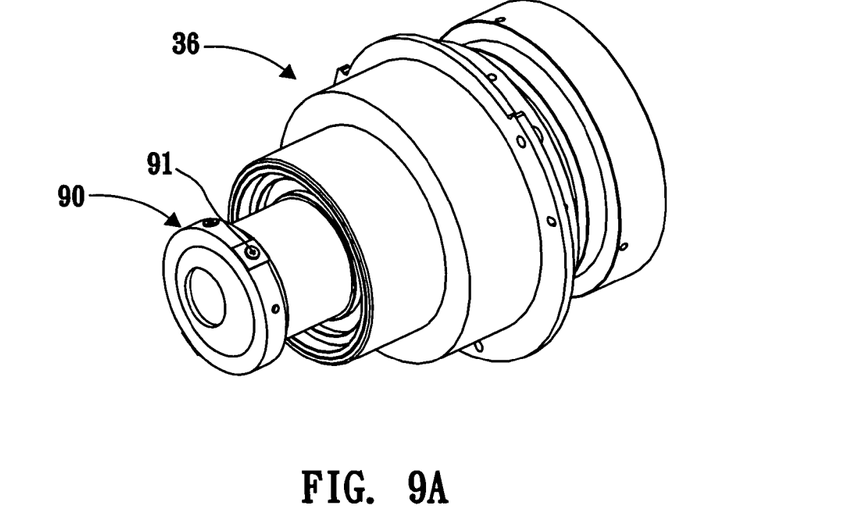
FIG. 9A and FIG. 9B are schematic views showing the correcting module of the correcting apparatus according to still another embodiment of the present invention.
Figure 9B:
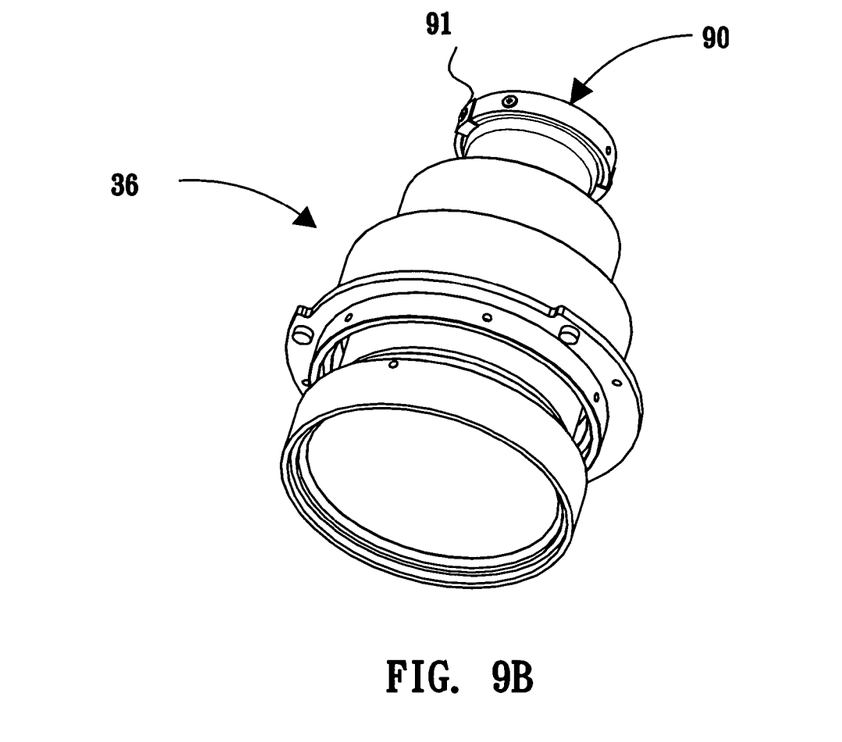

Please refer to FIG. 9A and FIG. 9B. FIG. 9A and FIG. 9B are schematic views showing the correcting module of the correcting apparatus according to still another embodiment of the present invention. In this embodiment, a correcting module 90 is fastened to a first outer circumference at one end of the projection lens 36 by using a fastener 91. The fastener 91 is attached to the projection lens 36 by using the claw of the fastener 91. The correcting module 90 can rotate along the first outer circumference at one end of the projection lens 36 so as to adjust the position of the correcting module 90. In still another embodiment, the correcting module can be fixed to the projection lens by glue.

By using the above two different methods, the correcting module can be fixed to the first outer circumference at one end of the projection lens. As long as a method can be used to fix the correcting module to the first outer circumference at one end of the projection lens, the method can be used in the present invention.

Figure 10:
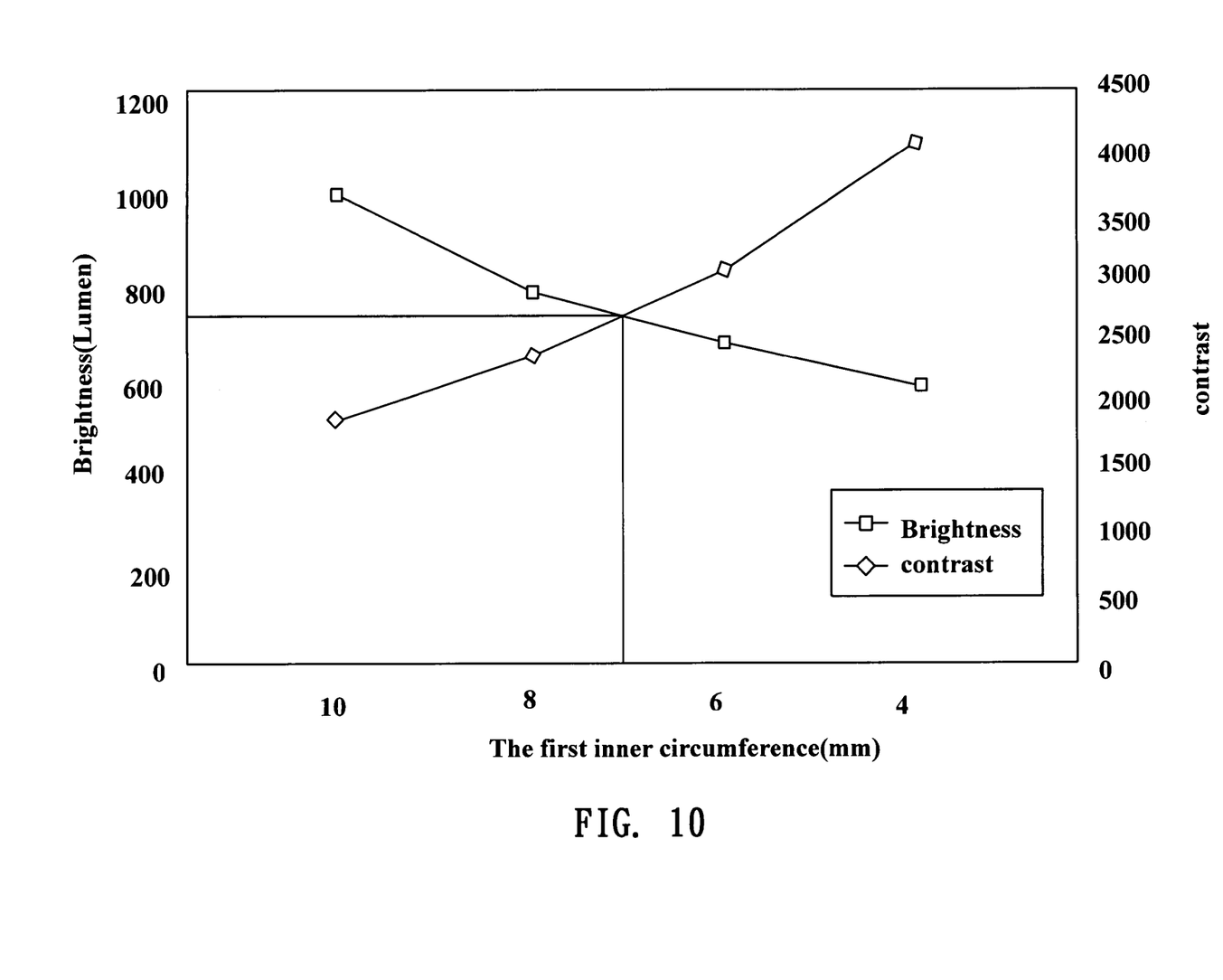
FIG. 10 is a schematic view showing the relation between the first inner circumference of the correcting module and the brightness/contrast of the reflected light signal.

Please refer to FIG. 10. FIG. 10 is a schematic view showing the relation between the first inner circumference of the correcting module and the brightness/contrast of the reflected light signal. As shown in FIG. 10, the size of the first inner circumference is in proportion to the brightness, that is, when the size of the first inner circumference is larger, the brightness is higher. However, the size of the first inner circumference is in inverse proportion to the contrast of the image light signal, that is, when the size of the first inner circumference is larger, the contrast of the image light signal is lower. Consequently, the most appropriate size of the inner circumference is determined by giving consideration to both the brightness and the contrast of the image light signal.

In the correcting apparatus of the present invention, a correcting module is disposed on a first outer circumference or a first inner circumference at one end of the projection lens for shielding the light signal. The corrected light signal is transmitted to the projection lens for being projected as an image. By using the correcting module of the present invention, the position of the ring shield can be adjusted by rotating the correcting module, and thereby the correcting module can effectively shield the light signal according to various variations in different projection system during the assembly of the projection system. Consequently, the contrast and definition of the projected images can be increased effectively.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A correcting apparatus for a projection system, the projection system comprising an optical system for providing a light signal to the correcting apparatus, the correcting apparatus comprising:
    a correcting module for shielding the light signal to produce a corrected light signal; and
    a projection lens for receiving the corrected light signal to produce a pair of image light signals, said projection lens including at least one cylindrical portion having a first surface extending around an outer circumference of the cylindrical portion, wherein the correcting module is disposed on said first surface at one end of the projection lens.

2. The correcting apparatus according to claim 1, wherein the correcting module comprises:

a ring shield including a second inner circumference and a second outer circumference, the second inner circumference and the second outer circumference being concentric; and a fixer attached to the second outer circumference for attaching the correcting module to the first outer circumference.

3. The correcting apparatus according to claim 2, wherein the fixer includes at least one positioning hole and a fixing component, the fixing component being fixed to the positioning hole for fixing the correcting module to the first outer circumference.

4. The correcting apparatus according to claim 1, wherein the correcting module comprises:

a ring shield including a second inner circumference and a second outer circumference, a predetermined distance being between the center of the second inner circumference and the center of the second outer circumference; and a fixer attached to the second outer circumference for attaching the correcting module to the first outer circumference.

5. The correcting apparatus according to claim 4, wherein the fixer includes a plurality of positioning holes and a fixing component, the fixing component being fixed to one of the positioning hole for fixing the correcting module to the first outer circumference.

6. The correcting apparatus according to claim 1, wherein the correcting module is fixed to the projection lens by glue.

7. The correcting apparatus according to claim 1, wherein the correcting module is fixed to the first outer circumference by using a fastener.

* * * * *